United States Patent
Kwak

(10) Patent No.: US 8,450,002 B2
(45) Date of Patent: May 28, 2013

(54) ELECTRODE ASSEMBLY INCLUDING ELECTRODE HAVING NON-COATED PORTION, METHOD OF MANUFACTURING THE SAME, AND SECONDARY BATTERY INCLUDING THE SAME

(75) Inventor: Yoontai Kwak, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 330 days.

(21) Appl. No.: 12/856,902

(22) Filed: Aug. 16, 2010

(65) Prior Publication Data

US 2011/0183170 A1   Jul. 28, 2011

(30) Foreign Application Priority Data

Jan. 26, 2010  (KR) .................. 10-2010-0007038

(51) Int. Cl.
*H01M 4/00*   (2006.01)
(52) U.S. Cl.
USPC .............. 429/94; 429/233; 429/234; 429/209
(58) Field of Classification Search
USPC .................. 429/94, 233, 234, 236, 209, 211, 429/129, 131, 137
See application file for complete search history.

(56) References Cited

U.S. PATENT DOCUMENTS

| | | |
|---|---|---|
| 2010/0285342 A1 | 11/2010 | Lee et al. |
| 2011/0027636 A1 | 2/2011 | Lee et al. |
| 2012/0156564 A1 | 6/2012 | Kim et al. |

FOREIGN PATENT DOCUMENTS

| | | | |
|---|---|---|---|
| EP | 1 724 857 A1 | | 11/2006 |
| JP | 2000-235853 A | | 8/2000 |
| JP | 2001-216997 | | 8/2001 |
| JP | 2001-266927 | * | 9/2001 |
| JP | 2001-266927 A | | 9/2001 |
| JP | 2006-93147 A | | 4/2006 |
| JP | 2009-211857 A | | 9/2009 |
| JP | 2011-519120 A | | 6/2011 |
| KR | 10-2004-0058921 | | 7/2004 |
| KR | 10-2005-0118579 | | 12/2005 |
| WO | WO 2009/096703 A1 | | 8/2009 |
| WO | WO 2009/128605 A2 | | 10/2009 |

OTHER PUBLICATIONS

Korean Patent Office Action Dated Oct. 19, 2011 in corresponding Application Serial No. 10-2010-0007038; 7 sheets.

(Continued)

*Primary Examiner* — Raymond Alejandro
(74) *Attorney, Agent, or Firm* — Christie, Parker & Hale, LLP

(57) ABSTRACT

Disclosed are an electrode assembly, a method of manufacturing the same, and a secondary battery including the same. The electrode assembly includes a first electrode coated with a first active material, a second electrode coated with a second active material, and a separator between the first and second electrodes. The first and second electrodes and the separator are wound into a jelly-roll. At least one of the first and second electrodes includes a non-coated portion where an active material is not coated on a roll-starting end or a roll-finishing end of the at least one of the first and second electrodes, the non-coated portion is at a region of a side surface of the at least one electrode, and the region having the non-coated portion does not face an electrode having a different polarity from the at least one of the first and second electrodes with the separator therebetween.

12 Claims, 6 Drawing Sheets

OTHER PUBLICATIONS

European Search Report dated May 26, 2011, for corresponding European Patent application 11150192.0, noting listed references in this IDS, 5 pages.

Patent Abstracts of Japan, and English machine translation of Japanese Publication 2001-216997, listed above, 9 pages.

English Machine Translation of Japanese Publication No. JP 2000-235853 A listed above, 20 pages.

English Machine Translation of Japanese Publication No. JP 2001-266927 A listed above, 8 pages.

English Machine Translation of Japanese Publication No. JP 2009-211857 A listed above, 42 pages.

Japanese Office Action dated Aug. 21, 2012 issued in Japanese Application 2010-128976, 2 pages.

* cited by examiner

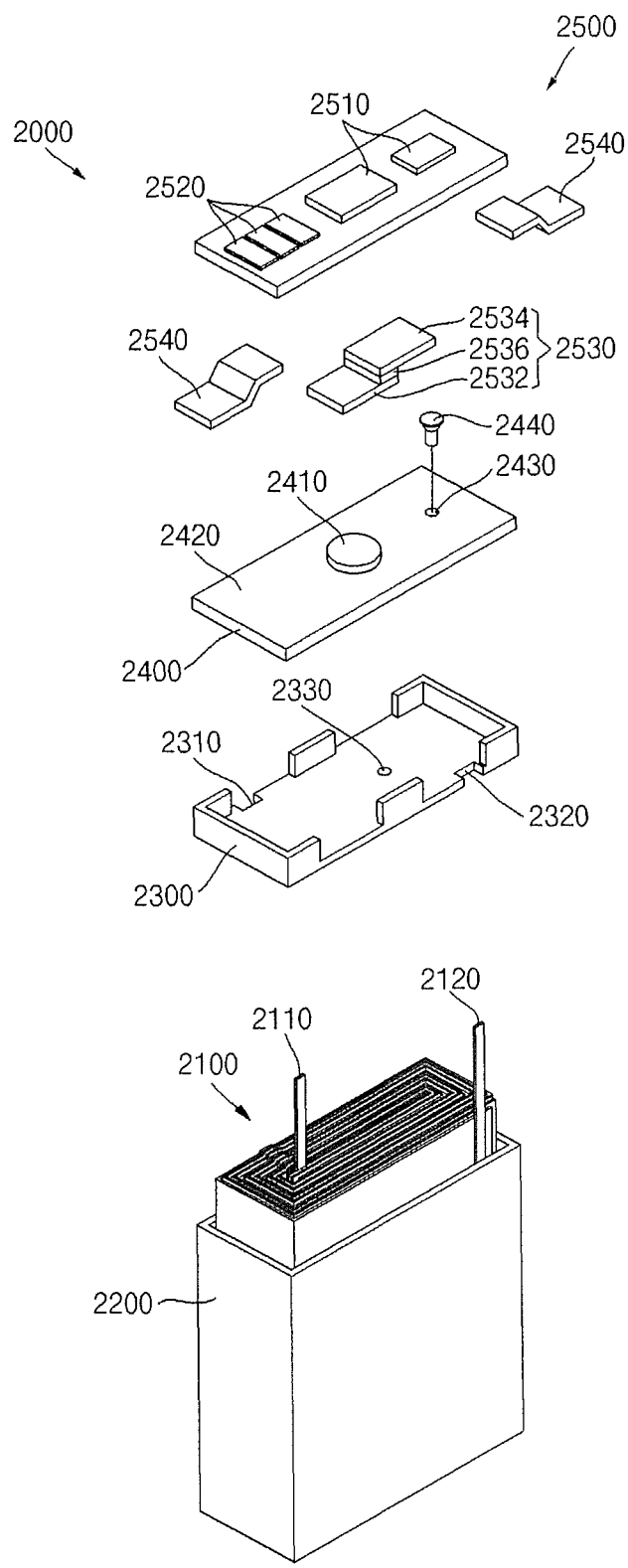

ELECTRODE ASSEMBLY INCLUDING ELECTRODE HAVING NON-COATED PORTION, METHOD OF MANUFACTURING THE SAME, AND SECONDARY BATTERY INCLUDING THE SAME

CROSS-REFERENCE RELATED APPLICATION

This application claims priority to and the benefit of Korean Patent Application No. 10-2010-0007038, filed on Jan. 26, 2010, in the Korean Intellectual Property Office, the entire content of which is incorporated herein by reference.

BACKGROUND

1. Field

One or more embodiments relate to an electrode assembly, a method of manufacturing the electrode assembly, and a secondary battery including the electrode assembly.

2. Description of the Related Art

As the electronics industry, communications and computer industries have been rapidly growing more advanced, portable electronic devices have increasingly propagated. Secondary batteries are mainly used as power sources for these portable electronic devices.

A secondary battery includes an electrode assembly that substantially charges and discharges electrical energy.

Since the properties and performance of a secondary battery are influenced by the electrode assembly, various types of research and development are being actively carried out on electrode assemblies.

SUMMARY

An aspect of an embodiment according to the present invention provides an electrode assembly having an electrode having a non-coated portion.

Another aspect of the present invention provides an electrode assembly in which the volume of the electrode assembly is reduced without reducing the capacity.

Still another aspect of the present invention provides a method of manufacturing the electrode assembly.

Still yet another aspect of the present invention provides a secondary battery having the electrode assembly.

According to at least one embodiment of the present invention, an electrode assembly includes: a first electrode coated with a first active material; a second electrode coated with a second active material; and a separator located between the first and second electrodes, the separator being for insulating the first electrode from the second electrode, wherein: the first and second electrodes and the separator are wound into a jelly-roll; at least one of the first and second electrodes includes a non-coated portion where an active material is not coated on a roll-starting end or a roll-finishing end of the at least one of the first and second electrodes; the non-coated portion is located at a region of a first side surface or a second side surface of the at least one of the first and second electrodes; and the region having the non-coated portion does not face an electrode having a different polarity from the at least one of the first and second electrodes with the separator interposed therebetween.

According to another embodiment of the present invention, a secondary battery includes: an electrode assembly; a case for receiving the electrode assembly; and a protection circuit module to which positive and negative tabs of the electrode assembly are electrically connected, wherein the electrode assembly includes: a first electrode coated with a first active material; a second electrode coated with a second active material; and a separator located between the first and second electrodes for insulating the first electrode from the second electrode, wherein the first and second electrodes and the separator are wound into a jelly-roll, wherein at least one of the first and second electrodes includes a non-coated portion where an active material is not coated on a portion of a roll-starting end or a roll-finishing end, and wherein the non-coated portion is located at a region of a first side surface or a second side surface of the at least one of the first and second electrodes, the region not facing an electrode having a different polarity from the at least one of the first and second electrodes with the separator interposed therebetween.

The first electrode may be a positive electrode and the second electrode may be a negative electrode.

The non-coated portion may be located at a region of the roll-finishing end on the first side surface of the first electrode.

The electrode assembly may further include a first electrode tab that is electrically and physically connected to the non-coated portion and extends from the electrode assembly.

The first electrode tab may be located at an outer circumference of the electrode assembly.

The non-coated portion is located at a region of the roll-starting end on the second side surface of the second electrode.

The electrode assembly may further include a second electrode tab that is physically electrically connected to the non-coated portion and extends from the electrode assembly.

The second electrode tab may be located at a central portion of the electrode assembly.

Each of the first and second electrodes may include a first active material coated portion coated with the first active material or a second active material coated portion coated with the second active material on the first side surface or the second side surface except for the non-coated portion.

The first active material coated portion or the second active material coated portion may exclude a region of at least one of an upper portion or a lower portion that define two edge portions of the first or second electrodes, except for the roll-starting end and the roll-finishing end of the first and second electrodes.

The electrode assembly may have a prismatic shape, and the non-coated portion may have a length spanning at least three surfaces of the electrode assembly.

The electrode assembly may have a prismatic shape, and the non-coated portion may have a length that is equal to or less than a length spanning four surfaces of the electrode assembly.

The separator may have a length that is greater than the length of the first electrode and equal to or greater than the length of the second electrode.

The case may be a pouch, wherein the pouch includes a main body having a receiving portion for receiving the electrode assembly; and a cover for covering the main body.

The case may be a prismatic can and the secondary battery may further include a cap assembly, wherein the cap assembly includes a cap plate sealing an opening of the prismatic can; an electrode terminal insulated from the cap plate and passing through the cap plate; a conductive plate electrically connected to the electrode terminal; and an insulation plate for insulating the conductive plate from the cap plate.

According to still another embodiment, a method of manufacturing an electrode assembly includes: providing first and second electrodes and a separator; and forming the electrode assembly by rolling up the first and second electrodes and the separator based on roll-starting ends of the first and second electrodes, wherein at least one of the first and second electrodes includes a non-coated portion on a portion of a first side surface or a second side surface of the roll-starting end or the roll-finishing end, and wherein the non-coated portion is located at a region of the first side surface or the second side surface of the at least one electrode, and the region having the non-coated portion does not face an electrode having a different polarity from the at least one electrode with the separator interposed therebetween.

The second electrode may have a length that is greater than the length of the first electrode.

The first electrode and the second electrode may be arranged such that the roll-starting end of the second electrode may extend further than the roll-starting end of the first electrode and the roll-finishing end of the second electrode may extend further than the roll-finishing end of the first electrode.

BRIEF DESCRIPTION OF THE DRAWINGS

The accompanying drawings are included to provide a further understanding of the present disclosure. The accompanying drawings, together with the specification, illustrate exemplary embodiments of the present disclosure and, together with the description, serve to explain principles of the present disclosure. In the drawings:

FIG. 9 illustrates a view of a secondary battery having an electrode assembly according to another embodiment of the present invention.

DETAILED DESCRIPTION

Figure 1:
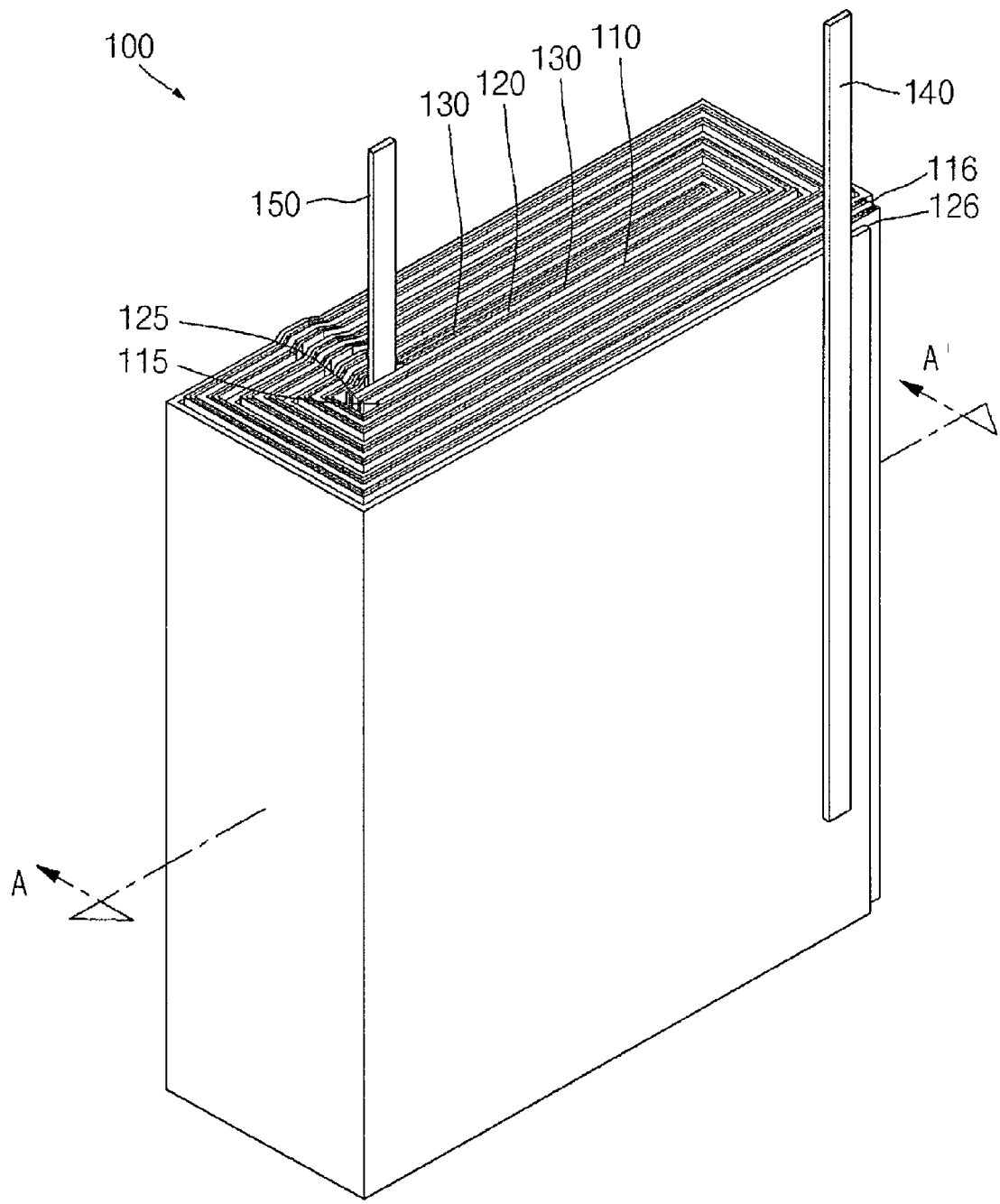
FIG. 1 illustrates a perspective view of an electrode assembly according to an embodiment of the present invention.

In the following detailed description, only certain exemplary embodiments of the present invention are shown and described, by way of illustration. As those skilled in the would recognize, the invention may be embodied in many different forms and should not be construed as being limited to the embodiments set forth herein. Like reference numerals designate like elements throughout the specification.

Figure 2A:
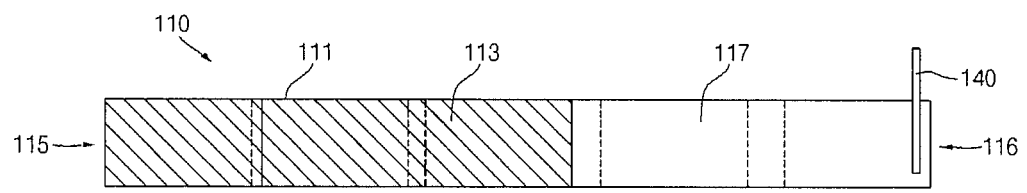
FIGS. 2A and 2B illustrate a first electrode of the electrode assembly according to an embodiment of the present invention.
Figure 2B:
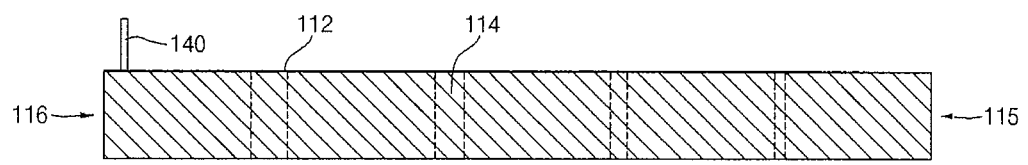
Figure 3A:
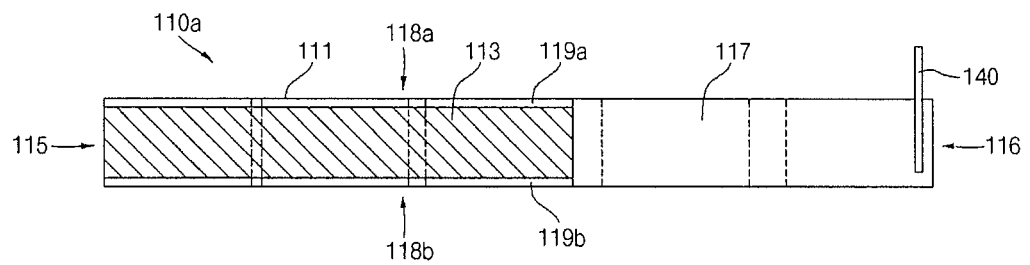
FIGS. 3A and 3B illustrate a first electrode of an electrode assembly according to an embodiment of the present invention.
Figure 3B:
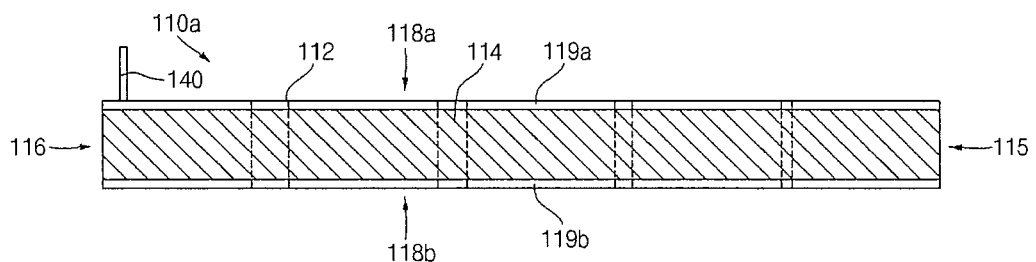
Figure 4A:
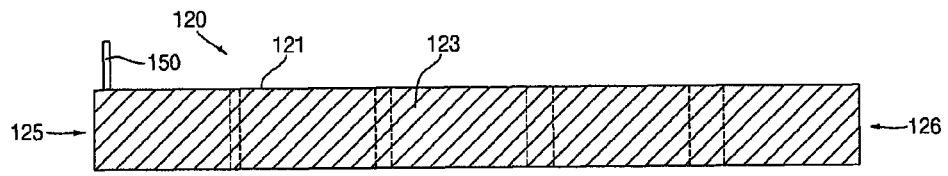
FIGS. 4A and 4B illustrate a second electrode of an electrode assembly according to an embodiment of the present invention.
Figure 4B:
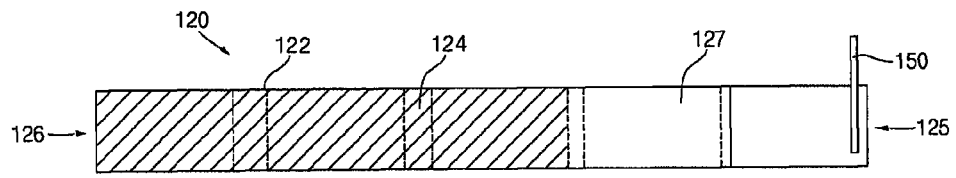
Figure 5A:
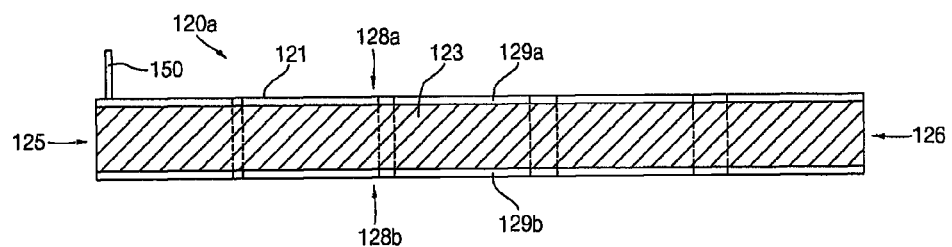
FIGS. 5A and 5B illustrate a second electrode of an electrode assembly according to an embodiment of the present invention.
Figure 5B:
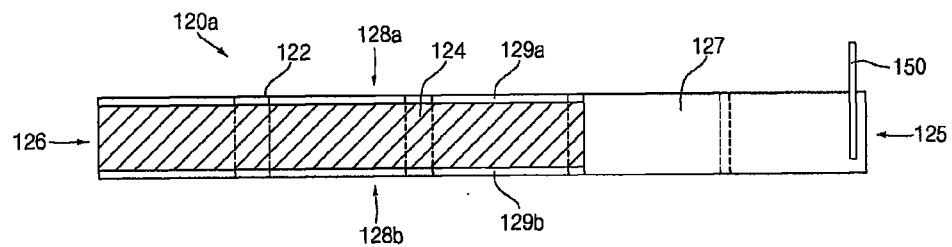
Figure 6:
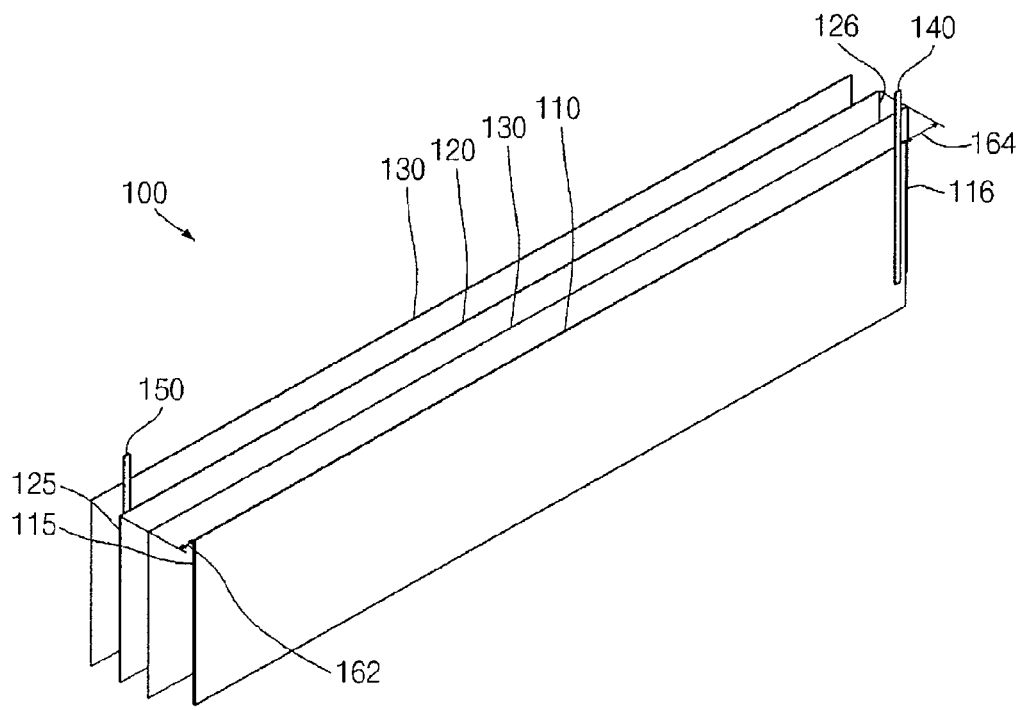
FIG. 6 illustrates the electrode assembly of FIG. 1, before it is wound into a jelly-roll.
Figure 7:
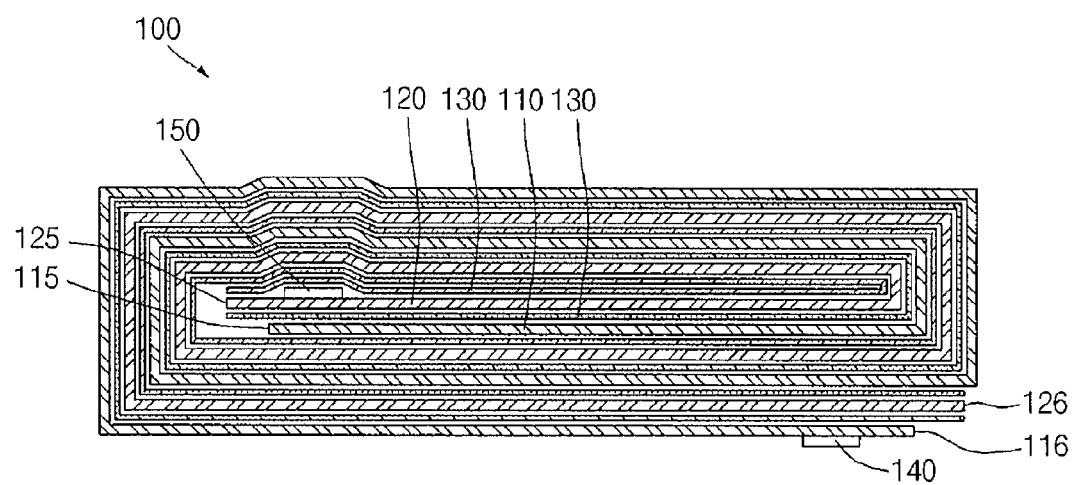
FIG. 7 illustrates a cross-sectional view taken along the line A-A' of FIG. 1.

FIG. 1 illustrates a perspective view of an electrode assembly according to an embodiment of the present invention, FIGS. 2A and 2B illustrate a first electrode of the electrode assembly according to an embodiment of the present invention (in further detail, FIG. 2A shows a first side surface of the first electrode and FIG. 2B shows a second side surface of the first electrode), FIGS. 3A and 3B illustrate a first electrode of an electrode assembly according to an embodiment of the present invention (in further detail, FIG. 3A shows a first side surface of the first electrode and FIG. 3B shows a second side surface of the first electrode), FIGS. 4A and 4B illustrate a second electrode of an electrode assembly according to an embodiment of the present invention (in further detail, FIG. 4A shows a first side surface of the second electrode and FIG. 4B shows a second side surface of the second electrode), FIGS. 5A and 5B illustrate a second electrode of an electrode assembly according to an embodiment of the present invention (in further detail, FIG. 5A shows a first side surface of the second electrode and FIG. 5B shows a second side surface of the second electrode), FIG. 6 illustrates the electrode assembly of FIG. 1, before it is wound into a jelly-roll, and FIG. 7 illustrates a cross-sectional view taken along the line A-A' of FIG. 1.

Referring to FIGS. 1 to 7, an electrode assembly 100 of an embodiment of the present invention includes a first electrode 110, a second electrode 120, and a separator 130.

As shown in FIGS. 2A, 2B, and FIG. 6, the first electrode 110 is provided in the form of a longitudinal strip shape.

The first electrode 110 includes a first side surface 111 (see FIG. 2A) and a second side surface 112 (see FIG. 2B) opposite to the first side surface 111. First active material coated portions 113 and 114 formed of a first active material are respectively formed on the first side surface 111 and the second side surface 112 of the first electrode 110.

At this point, the first electrode 110 is rolled up in a jelly-roll. Among longitudinal opposite ends of the first electrode 110, an end that is initially rolled up when the first electrode 110 is being rolled up will be referred to as a roll-starting end 115 and an end that is finally rolled up when the first electrode 110 is being rolled up will be referred to as a roll-finishing end 116.

A non-coated portion 117 is formed on the roll-finishing end 116 of the first electrode 110. That is, the non-coated portion 117 is formed on a region of the first side surface 111 of the roll-finishing end 116 of the first electrode 110.

The non-coated portion 117 is formed on a region extending from the roll-finishing end 116 toward the roll-starting end 115 of the first electrode 110 by a preselected or predetermined length.

The region for the non-coated portion 117 is lengthened to enclose at least three surfaces of the electrode assembly 100, the at least three surfaces including a front surface, a left surface and a rear surface of the electrode assembly 100 in view point of FIG. 1. The region for the non-coated portion 117 may be lengthened to enclose at most four surfaces of the electrode assembly 100, the at most four surfaces including a front surface, a left surface, a right surface or a rear surface of the electrode assembly 100 in view point of FIG. 1. This is to reduce or minimize a region of the first active material coated portion 113 of the first electrode 110 by removing an unnecessary region of the first active material coated portion 113, thereby reducing or minimizing a volume of the electrode assembly 100. That is, this is to reduce or minimize a volume of the electrode assembly for a given capacity of the electrode assembly 100.

In more detail, as shown in FIG. 1, the electrode assembly 100 is rolled up in a cylinder shape and then is shaped in a prismatic shape by pressing the outer circumference of the rolled-up electrode assembly 100. At this point, the four surfaces are defined by the outer circumference of the prismatic electrode assembly 100 (in FIGS. 2A and 2B, the four surfaces are divided by dotted-lines on the first side surface and the second side surface of the first electrode 110. At this point, the dotted-lines define boundary lines between the circumferential surfaces). Namely, the non-coated portion 117 is formed to define at least three surfaces or at most four surfaces of the outer circumference of the prismatic electrode assembly 100.

The location of the non-coated portion 117 on the region of the roll-finishing end 116 of the first electrode 110 depends on the arrangement of the first electrode 110 with respect to the second electrode 120. That is, the electrode assembly 100 is designed to charge and discharge energy at an area between the first and second electrodes 110 and 120, which have opposite polarities to each other and between which the separator 130 is disposed. When the first and second electrodes 110 and 120 are rolled up together, as shown in FIGS. 1 and 7, the non-coated portion 117 does not directly face the second electrode 120. Therefore, even though the first active material coated portion 113 is located at a region corresponding to the non-coated portion 117, the first active material coated portion 113 located on the region corresponding to the non-coated portion 117 does not function to charge and discharge the electrode assembly and thus the region corresponding to the non-coated portion 117 does not require an active material coating.

Therefore, the non-coated portion 117 may be located on a region of the roll-finishing end 116, which does not directly face the second electrode 120 with the separator 130 interposed therebetween.

Meanwhile, the first active material coated portion 114 may be formed along the entire length of the second side surface 112 of the first electrode 110, which is opposite to the first side surface 111 of the first electrode 110. That is, since the second side surface 112 of the first electrode 110 faces the second electrode 120 along its entire length with the separator 130 interposed therebetween, the first active material coated portion 113 is formed along the entire length of the second side surface 112.

In one embodiment, the first electrode 110 may be a positive electrode and the second electrode 120 may be a negative electrode. Alternatively, the first electrode 110 may be the negative electrode and the second electrode 120 may be the positive electrode. For simplicity, the following will describe a case where the first electrode 110 is the positive electrode and the second electrode 120 is the negative electrode.

In one embodiment, a first electrode 110a, shown in FIGS. 3A and 3B, is equivalent to the first electrode 110 of the above-mentioned embodiment, except that the first active material coated portions 113 and 114 are not located on upper and lower portions 118a and 118b that are two edge portions of the first electrode 110a. Upper and lower portions 118a and 118b do not include the roll-starting and roll-finishing ends 115 and 116 among four edge portions of the first electrode 110a, and define upper and lower non-coated portions 119a and 119b.

At this point, the first electrode 110a shown in FIGS. 3A and 3B has both of the upper non-coated portion 119a and the lower non-coated portion 119b. However, if necessary, the first electrode 110a may have only one of the upper non-coated portion 119a and the lower non-coated portion 119b.

The electrode assembly 100 may include a first electrode tab 140 that is electrically and physically connected to the first electrode 110 and extends out of the electrode assembly 100.

The first electrode tab 140 may be located on the non-coated portion 117 of the first electrode (110 of FIGS. 2A and 2B or 110a of FIGS. 3A and 3B). That is, the first electrode tab 140 may be located on the first side surface 111 of the roll-finishing end 116 of the first electrode 110 or 110a. Therefore, since the first electrode tab 140 is located on the roll-finishing end 116 of the first electrode 110 or 110a, which is finally rolled up, the first electrode tab 140 is located on an outer circumference of the prismatic electrode assembly 100.

Although not shown in the drawings, at least one first electrode tab 140 may be located on the upper non-coated portion 119a or the lower non-coated portion 119b of the first electrode 110a. In this case, the first electrode tab 140 may be located at a central portion of the electrode assembly 100 and/or at the outer circumference portion.

The coupling of the first electrode 110 with the first electrode tab 140 may be performed by resistance-welding, spot-welding, or laser-welding. However, the coupling may be performed by other coupling methods known to those skilled in the art.

As shown in FIGS. 4A, 4B, and FIG. 6, the second electrode 120 is provided in the form of a longitudinal strip shape.

The second electrode 120 includes a first side surface 121 (see FIG. 4A) and a second side surface 122 (see FIG. 4B) opposite to the first side surface 121. Second active material coated portions 123 and 124 are respectively located on the first side surface 121 and the second side surface 122.

At this point, the second electrode 120 is rolled up in a jelly-roll. Among longitudinal opposite ends of the second electrode 120, an end that is initially rolled up when the second electrode 120 is being rolled up will be referred to as a roll-starting end 125 and an end that is finally rolled up when the second electrode 120 is being rolled up will be referred to as a roll-finishing end 126.

A non-coated portion 127 is formed on a region of the second side surface 122 of the roll-staring end 125 of the second electrode 120.

The non-coated portion 127 is formed on a region extending from the roll-starting end 125 toward the roll-finishing end 126 of the second electrode 120.

The non-coated portion 127 is lengthened to enclose at least three surfaces of the electrode assembly 100. The non-coated portion 127 may be lengthened to enclose at most four surfaces of the electrode assembly 100. This is to reduce or minimize a region of the second active material coated portion 124 of the second electrode 120 by removing an unnecessary region of the second active material coated portion 124, thereby reducing or minimizing a volume of the electrode assembly 100. That is, this is to reduce or minimize a volume for a given capacity of the electrode assembly 100.

In more detail, as shown in FIG. 1, the electrode assembly 100 is rolled up in a cylinder shape and then is shaped in a prismatic shape by pressing the outer circumference of the rolled-up electrode assembly 100. At this point, the four surfaces are defined by the interior circumference of the prismatic electrode assembly 100 (in FIGS. 4A and 4B, the four surfaces are divided by dotted-lines on the first side surface and the second side surface of the second electrode 120. At this point, the dotted-lines define boundary lines between the interior circumferential surfaces). Namely, the non-coated portion 127 defines at least three surfaces or at most four surfaces of the interior circumference of the prismatic electrode assembly 100.

The location of the non-coated portion 127 on the region of the roll-starting end 125 of the second electrode 120 may depend on the arrangement of the second electrode with respect to the first electrode 110. That is, the electrode assembly 100 is designed to charge and discharge energy at an area between the first and second electrodes 110 and 120, which have polarities opposite to each other and between which the separator 130 is located. When the first and second electrodes 110 and 120 are rolled up together, as shown in FIGS. 1 and 7, the non-coated portion 127 does not face the first electrode 110. Therefore, even though the second active material coated portion 124 is located at a region corresponding to the non-coated portion 127, the second active material coated portion 124 located on the region corresponding to the non-coated portion 127 does not function to charge and discharge the energy and thus the region corresponding to the non-coated portion 127 does not require an active material coating.

Therefore, the non-coated portion 127 may be located on the region of the roll-starting end 125, which does not face the first electrode 110 with the separator 130 interposed therebetween.

Meanwhile, the second active material coated portion 123 may be formed on the entire length of the first side surface 121 of the second electrode 120. That is, since the first side surface 121 of the second electrode 120 entirely faces the first electrode 110 with the separator 130 interposed therebetween, the second active material coated portion 123 is formed on the entire length of the first side surface 121.

A second electrode 120a shown in FIGS. 5A and 5B as another embodiment is equal to the second electrode 120 of the above-mentioned embodiment except that the second active material coated portions 123 and 124 are not located on upper and lower portions 128a and 128b that are two edge portions except for the roll-starting and roll-finishing ends 125 and 126 among four edge portions of the second electrode 120a to define upper and lower non-coated portions 129a and 129b.

At this point, the second electrode 120a shown in FIGS. 5A and 5B has both of the upper non-coated portion 129a and the lower non-coated portion 129b. However, if necessary, the second electrode 120a may have only one of the upper non-coated portion 129a and the lower non-coated portion 129b.

The electrode assembly 100 may include a second electrode tab 150 that is electrically and physically connected to the second electrode 120 and extends out of the electrode assembly 100.

The second electrode tab 150 may be located on the non-coated portion 127 of the second electrode (120 of FIGS. 4A and 4B or 120a of FIGS. 5A and 5B). That is, the second electrode tab 150 may be located on the second side surface 122 of the roll-starting end 125 of the second electrode 120 or 120a. Therefore, since the second electrode tab 150 is located on the roll-starting end 125 of the second electrode 120 or 120a, which is initially rolled up, the second electrode tab 150 is located on a central portion of the electrode assembly 100.

Although not shown in the drawings, at least one second electrode tab 150 may be located on a portion of the upper non-coated portion 129a or the lower non-coated portion 129b of the second electrode 120a. In this case, the second electrode tab 150 may be located at the outer circumferential portion of the electrode assembly 100 as well as the central portion.

The coupling of the second electrode 120 with the second electrode tab 150 may be performed by resistance-welding, spot-welding, or laser-welding. However the coupling may be performed by other coupling methods.

The second electrode 120 has a length that is greater than that of the first electrode 110.

The separator 130 is located between the first and second electrodes 110 and 120 to insulate the first and second electrodes 110 and 120 from each other.

Since the electrode assembly 100 of the embodiments is provided in the form of a jelly-roll, at least two separators 130 are necessary. That is, as shown in FIG. 6, one of the separators 130 may be located between the first and second electrodes 110 and 120 and the other of the separators 130 may be located on the second side surface of the second electrode 120.

In one embodiment, the electrode assembly 100 is rolled up (e.g. in a clockwise motion) starting from the roll-starting ends 115 and 125 of the first and second electrodes 110 and 120. Based on the above described motion and the arrangement of the roll-starting end 125 of the second electrode 120, the other separator 130 is located on the second side surface of the second electrode 120.

The separators 130 have lengths that are greater than the first electrode 110 and equal to or greater than that of the second electrode 120.

A method of manufacturing the electrode assembly 100 according to an embodiment of the present invention is described below. As shown in FIG. 6, the first electrode (110 of FIGS. 2A and 2B or 110a of FIGS. 3A and 3B), the second electrode (120 of FIGS. 4A and 4B or 120a of FIGS. 5A and 5B), and the two separators 130 are prepared.

The first electrode 110 or 110a, the second electrode 120 or 120a, and the separators 130 are aligned.

At this point, since the second electrode 120 has a length greater than that of the first electrode 110 and the first and second electrodes 110 and 120 are respectively positive and negative electrodes, in one embodiment, the first electrode 110 or 110a, the second electrode 120 or 120a, and the separators 130 are aligned such that the roll-starting end 125 of the second electrode 120 extends further than the first roll-starting end 115 of the first electrode 110 by a first length (refer to "162" in FIG. 6). In one embodiment, the roll-finishing end 126 of the second electrode 120 extends further than the roll-finishing end 116 of the first electrode 110 by a second length (refer to "164" in FIG. 6).

In one embodiment, the first electrode 110, the second electrode 120, and the separators 130 are rolled up in a cylindrical shape based on the roll-starting ends 115 and 125 of the first and second electrodes 110 and 120. The cylindrical shape based on the roll-starting end 125 of the second electrode 120 may then be configured in a prismatic shape by pressing the outer circumference of the cylindrical electrode assembly 100.

Figure 8:
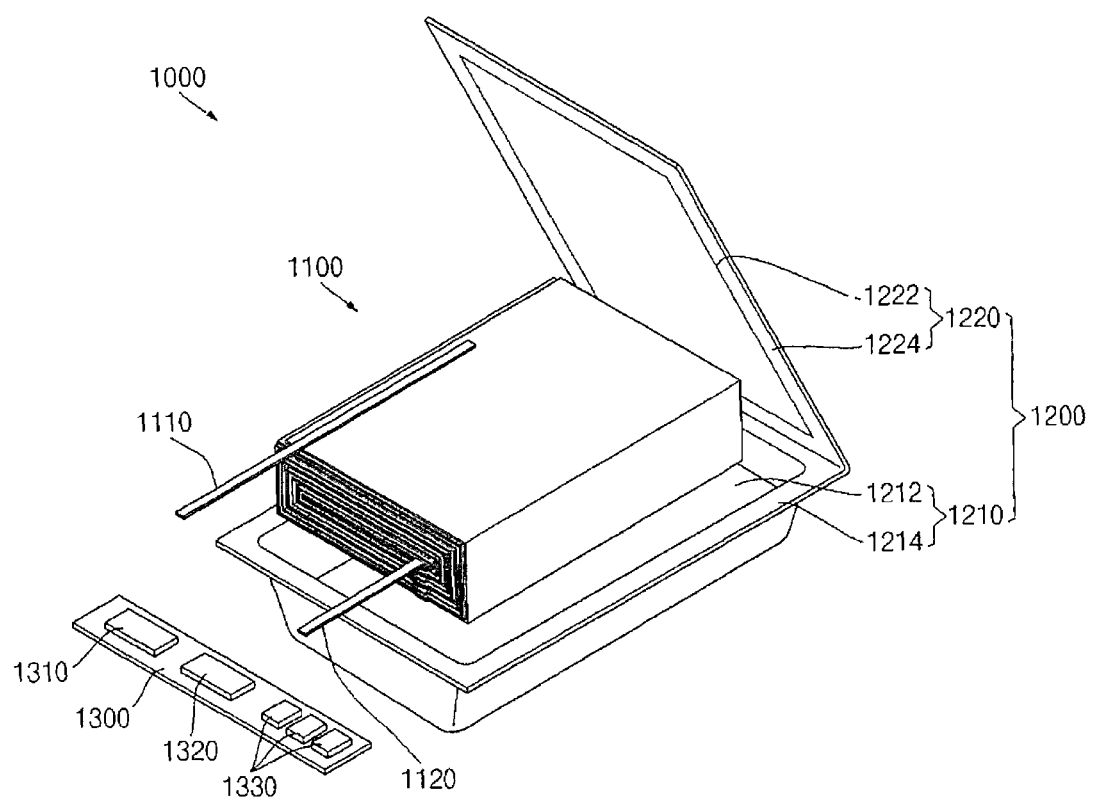
FIG. 8 illustrates a view of a secondary battery having an electrode assembly according to another embodiment of the present invention.

FIG. 8 shows a secondary battery having an electrode assembly according to an embodiment of the present invention.

Referring to FIG. 8, a secondary battery 1000 of an embodiment of the present invention includes an electrode assembly 1100. Here, the electrode assembly 110 may be the electrode assembly 100 of any of FIGS. 1 to 7. The electrode assembly 1100 includes first and second electrode tabs 1110 and 1120. The first and second electrode tabs 1110 and 1120 may be respectively the first and second electrode tabs 140 and 150 of FIGS. 1 to 7, for example.

The secondary battery 1000 includes a pouch 1200 for receiving the electrode assembly 1100 and a protection circuit module 1300.

The pouch 1200 includes a main body 1210 and a cover 1220.

The main body 1210 includes a receiving portion 1212 for receiving the electrode assembly 1100 and a sealing portion 1214 extending from an inlet of the receiving portion 1212.

The cover 1220 extends from a peripheral portion of the sealing portion 1214 of the main body 1210. The cover 1220 fully covers the receiving portion 1212 of the main body 1210 and is sealed with the sealing portion 1214 of the main body 1210. To achieve this, the cover 1220 includes a receiving cover region 1222 corresponding to the receiving portion 1212 of the main body 1210 and a sealing portion 1224 corresponding to the sealing portion 1214 of the main body 1210.

Accordingly, after the electrode assembly 1100 is received in the receiving portion 1212 of the main body 1210, the cover 1220 covers the receiving portion 1212 and the sealing portion 1214 of the main body 1210 is sealed with the sealing portion 1224 of the cover 1220 through a bonding method such as a thermal-bonding.

After sealing the pouch 1200, the first and second electrode tabs 1110 and 1120 extending from the electrode assembly 1100 are exposed to an external side. Here, the first and second electrode tabs 1110 and 1120 are connected to the protection circuit module 1300.

The protection circuit module 1300 functions to control not only the charging/discharging of the electrode assembly 1100 but also the operation of the secondary battery 1000. Meanwhile, the protection circuit module 1300 includes a control device 1310 such as an integrated circuit device, a secondary protection device 1320 for preventing current from excessively flowing in the secondary battery 1000, and an external terminal 1330 connecting the secondary battery 1000 to an external device.

FIG. 9 shows a secondary battery having an electrode assembly according to an embodiment of the present invention.

Referring to FIG. 9, a secondary battery 2000 of this embodiment includes an electrode assembly 2100.

The electrode assembly 2100 may be the electrode assembly 100 of FIGS. 1 to 7.

The electrode assembly 2100 is received in a can 2200 having an opening.

The electrode assembly 2100 includes first and second electrode tabs 2110 and 2120. The first and second electrode tabs 2110 and 2120 may be the first and second electrode tabs 140 and 150 of FIGS. 1 to 7.

An insulation case 2300 is inserted into the can 2200, which receives the electrode assembly 2100, through the opening thereof.

The insulation case 2300 prevents or substantially prevents the electrode assembly 2100 from moving in the can 2200 and insulates a cap plate 2400, which will be described later, and the electrode assembly 2100 from each other.

The insulation case 2300 is provided with first and second through holes 2310 and 2320 through which the first and second electrode tabs 2110 and 2120 pass, respectively. The insulation case 2300 is further provided with an electrolyte injection hole 2330 for injection of electrolyte.

The cap plate 2400 covers the opening of the can 2200 receiving the electrode assembly 2100, thereby sealing the can 2200.

An electrode terminal 2410 is provided at a portion (e.g. a predetermined portion) of the cap plate 2400. The electrode terminal 2410 is insulated from a plate terminal 2420 that is the other portion of the cap plate 2400. The cap plate 2400 is provided with an electrolyte injection hole 2430 for injecting the electrolyte. After the electrolyte is injected, the electrolyte injection hole 2430 is plugged by a plug 2440.

The electrode terminal 2410 is electrically connected to one of the first and second electrode tabs 2110 and 2120 of the electrode assembly 1100. The plate terminal 2420 is electrically connected to the other one of the first and second electrode tabs 2110 and 2120.

The secondary battery 2000 includes a protection circuit module 2500 for controlling the charging/discharging and operation of the secondary battery 2000.

The protection circuit module 2500 includes a control device 2510, such as an integrated circuit device, and an external terminal 2520 connecting (e.g. electrically connecting) the secondary battery 2000 to an external device.

The protection circuit module 2500 is electrically connected to the electrode terminal 2410 and the plate terminal 2420.

At this point, a secondary protective device 2530, for preventing current from excessively flowing in the secondary battery 2000, may be provided between the protection circuit module 2500 and the electrode terminal 2410.

The secondary protective device 2530 includes a first terminal lead 2532 connected to the electrode terminal 2410, a second terminal lead 2534 connected to the protection circuit module 2500, and a positive temperature coefficient (PTC) device 2536 between the first and second terminal leads 2532 and 2534.

Meanwhile, the protection circuit module 2500 is electrically connected to the plate terminal 2420.

The electrical connection between the protection circuit module 2500 and the plate terminal 2420 is realized by a connecting member 2540. The connecting member 2540 is connected (e.g. electrically connected) to the protection circuit module 2500 by a method such as soldering and is connected to the plate terminal 2420 by a method such as soldering, laser welding, resistance welding, or by a coupling member such as a bolt.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode assembly comprising:
a first electrode coated with a first active material;
a second electrode coated with a second active material; and
a separator located between the first and second electrodes, the separator being for insulating the first electrode from the second electrode, wherein:
the first and second electrodes and the separator are wound into a jelly-roll;
at least one of the first and second electrodes comprises a roll-starting end non-coated portion or a roll-finishing end non-coated portion where a respective one of the first and second active materials is not coated on the roll-starting end or the roll-finishing end of the at least one of the first and second electrodes;
the roll-starting end non-coated portion or the roll-finishing end non-coated portion is located at a region of a first side surface or a second side surface of the at least one of the first and second electrodes;
the region having the roll-starting end non-coated portion or the roll-finishing end non-coated portion does not face the first or second electrode having a different polarity from the at least one of the first and second electrodes with the separator interposed therebetween; and
at least one of the first and second electrodes comprises at least one of an upper non-coated portion or a lower non-coated portion, where a respective one of the first and second active materials is not coated on an upper portion or a lower portion of the first or second electrode at a region other than the roll-starting end or the roll-finishing end.

2. The electrode assembly as claimed in claim 1, wherein the first electrode is a positive electrode and the second electrode is a negative electrode.

3. The electrode assembly as claimed in claim 1, wherein the roll-finishing end non-coated portion is located at a region of the roll-finishing end on the first side surface of the first electrode.

4. The electrode assembly as claimed in claim 3, further comprising a first electrode tab that is electrically and physically connected to the roll-finishing end non-coated portion and extends from the electrode assembly.

5. The electrode assembly as claimed in claim 4, wherein the first electrode tab is located at an outer circumference of the electrode assembly.

6. The electrode assembly as claimed in claim 3, further comprising a second electrode tab that is physically and electrically connected to the roll-starting end non-coated portion and extends from the electrode assembly.

7. The electrode assembly as claimed in claim 6, wherein the second electrode tab is located at a central portion of the electrode assembly.

8. The electrode assembly as claimed in claim 1, wherein the roll-starting end non-coated portion is located at a region of the roll-starting end on the second side surface of the second electrode.

9. The electrode assembly as claimed in claim 1, wherein each of the first and second electrodes comprises a first active material coated portion coated with the first active material or a second active material coated portion coated with the second active material on at least one of the first side surface or the second side surface except for the roll-starting end non-coated portion, the roll-finishing end non-coated portion, the upper non-coated and the lower non-coated portion.

10. The electrode assembly as claimed in claim 1, wherein the electrode assembly has a prismatic shape, and at least one of the roll-starting end non-coated portion or the roll-finishing end non-coated portion has a length spanning at least three surfaces of the electrode assembly.

11. The electrode assembly as claimed in claim 10, wherein the electrode assembly has a prismatic shape, and at least one of the roll-starting end non-coated portion and the roll-finishing end non-coated portion has a length equal to or less than a length spanning four surfaces of the electrode assembly.

12. The electrode assembly as claimed in claim 1, wherein the separator has a length that is greater than the length of the first electrode and equal to or greater than the length of the second electrode.

\* \* \* \* \*